United States Patent
Jacquel et al.

(12)

(10) Patent No.: US 10,400,062 B2
(45) Date of Patent: Sep. 3, 2019

(54) METHOD FOR PRODUCING A POLYESTER CONTAINING AT LEAST ONE 1,4:3,6-DIANHYDROHEXITOL UNIT WITH IMPROVED COLOURING

(71) Applicant: Roquette Freres, Lestrem (FR)

(72) Inventors: Nicolas Jacquel, Lambersart (FR); René Saint-Loup, Lomme (FR); Françoise Fenouillot-Rimlinger, l'Isle d'abeau (FR); Jean-Pierre Pascault, Villeurbanne (FR); Alain Rousseau, Saint-Priest (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 15/522,726

(22) PCT Filed: Oct. 28, 2015

(86) PCT No.: PCT/FR2015/052901
§ 371 (c)(1),
(2) Date: Apr. 27, 2017

(87) PCT Pub. No.: WO2016/066956
PCT Pub. Date: May 6, 2016

(65) Prior Publication Data
US 2017/0335055 A1    Nov. 23, 2017

(30) Foreign Application Priority Data
Oct. 29, 2014   (FR) ..................... 14 60403

(51) Int. Cl.
| C08G 63/02 | (2006.01) |
|---|---|
| C08G 63/54 | (2006.01) |
| C08K 3/22 | (2006.01) |
| C08G 63/672 | (2006.01) |
| C08G 63/84 | (2006.01) |
| C08G 63/86 | (2006.01) |
| C08G 63/127 | (2006.01) |

(52) U.S. Cl.
CPC .......... *C08G 63/54* (2013.01); *C08G 63/127* (2013.01); *C08G 63/672* (2013.01); *C08G 63/84* (2013.01); *C08G 63/863* (2013.01); *C08K 3/22* (2013.01)

(58) Field of Classification Search
USPC ........................................... 528/304
See application file for complete search history.

(56) References Cited

U.S. PATENT DOCUMENTS

| 6,020,421 A | 2/2000 | Fukushima et al. |
|---|---|---|
| 2006/0173154 A1 | 8/2006 | Charbonneau |

FOREIGN PATENT DOCUMENTS

| CN | 1298343 A | 6/2001 |
|---|---|---|
| FR | 2 888 851 A1 | 1/2007 |
| JP | 2013-166874 A | 8/2013 |
| WO | 99/054119 A1 | 10/1999 |
| WO | WO 2004/048437 A2 | 6/2004 |
| WO | WO 2006/032022 A1 | 3/2006 |
| WO | WO 2010/010282 A1 | 1/2010 |
| WO | WO 2013/034743 A1 | 3/2013 |
| WO | WO 2013/183873 A1 | 12/2013 |
| WO | WO 2013/183874 A1 | 12/2013 |

*Primary Examiner* — Terressa Boykin
(74) *Attorney, Agent, or Firm* — Oliff PLC

(57) ABSTRACT

The invention concerns a method for producing a polyester containing at least one 1,4:3,6-dianhydrohexitol unit comprising: •a step of introducing, into a reactor, monomers comprising at least one monomer (A) that is a diacid or a diester and at least one monomer (B) that is a 1,4:3,6-dianhydrohexitol; •a step of introducing, into the reactor, a catalytic system comprising either a catalyst comprising the element germanium and a catalyst comprising the element aluminum, or a catalyst comprising the elements germanium and aluminum, or a mixture of said two catalysts; •a step of polymerizing said monomers to form the polyester; •a step of recovering a polyester composition comprising the polyester and the catalytic system. The invention also concerns a polyester composition containing a catalytic system comprising either a catalyst comprising the element germanium and a catalyst comprising the element aluminum, or a catalyst comprising the elements germanium and aluminum, or a mixture of said two catalysts, and the use of same to reduce the coloring of the polyester.

20 Claims, No Drawings

METHOD FOR PRODUCING A POLYESTER CONTAINING AT LEAST ONE 1,4:3,6-DIANHYDROHEXITOL UNIT WITH IMPROVED COLOURING

This application is a national stage of International Patent Application No. PCT/FR2015/052901, filed Oct. 28, 2015, which claims the benefit of French Patent Application 1460403, filed Oct. 29, 2014, each of which is hereby incorporated by reference in its entirety.

FIELD OF THE INVENTION

The present invention relates to a process for manufacturing a polyester comprising at least one 1,4:3,6-dianhydrohexitol unit, using a catalytic system that makes it possible to reduce the coloring of the polyester thus formed. A subject of the invention is also a polyester composition comprising said catalytic system.

TECHNOLOGICAL BACKGROUND OF THE INVENTION

Because of their numerous advantages, plastics have become inescapable in the mass manufacture of objects. Indeed, because of their thermoplastic nature, it is possible to manufacture objects of any type from these plastics, at a high rate.

Certain aromatic polyesters are thermoplastic and have thermal properties which allow them to be used directly for the manufacture of materials. They comprise aliphatic diol and aromatic diacid units. Among these aromatic polyesters, mention may be made of polyethylene terephthalate (PET), which is a polyester comprising ethylene glycol and terephthalic acid units, used for example in the manufacture of containers, packagings or textile fibers. PET may be a transparent polymer and may thus be useful for manufacturing objects whose optical properties are important. It may also be opaque and white in the case where this polymer is semicrystalline, if the crystallinity and size of the crystallites are important. It is thus necessary in both cases for PET to have the least possible coloring.

According to the invention, the term "monomer units" is intended to mean units, included in the polyester, which can be obtained after polymerization of a monomer. With regard to the ethylene glycol and terephthalic acid units included in PET, they can be obtained either by esterification reaction of ethylene glycol and terephthalic acid, or by transesterification reaction of ethylene glycol and terephthalic acid ester.

The development of polyesters resulting from biological resources renewable in the short term has become an ecological and economic imperative, in the face of the exhaustion and of the increase in costs of fossil resources such as oil. One of the main concerns today in the polyester field is therefore that of providing polyesters of natural origin (biobased polyesters). This is particularly true for polyesters comprising aliphatic diol and aromatic acid units. Thus, groups such as Danone or Coca-Cola today market drink bottles made of partially biobased PET, this PET being manufactured from biobased ethylene glycol. One drawback of this PET is that it is only partially biobased, since the terephthalic acid is for its part generally derived from fossil resources. However, processes for synthesizing biobased terephthalic acid and biobased terephthalic acid ester have recently been developed, thereby allowing the manufacture of totally biobased PET. Mention may thus be made of application WO 2013/034743 A1 which describes in particular such PETs.

However, for certain applications or under certain conditions of use, these polyesters do not exhibit all the required properties. This is why glycol-modified PETs (PETg) have been developed. They are generally polyesters comprising, in addition to the ethylene glycol and terephthalic acid units, cyclohexanedimethanol (CHDM) units. The introduction of this diol into the PET allows it to adapt the properties to the intended application, for example to improve its impact resistance or its optical properties, in particular when the PETg is amorphous.

Other modified PETs have also been developed by introducing into the polyester 1,4:3,6-dianhydrohexitol units, especially isosorbide (PEIT). These modified polyesters have higher glass transition temperatures than the unmodified PETs or PETg comprising CHDM. In addition, 1,4:3,6-dianhydrohexitols have the advantage of being able to be obtained from renewable resources such as starch. These modified polyesters are especially useful for manufacturing bottles, films, thick sheets, fibers or articles requiring high optical properties. However, one problem with these PEITs is that they may have generally high coloring, generally higher than that of PETg or PETs, even when the amounts of isosorbide used in the manufacture of polyester are very low.

In order to solve this problem of high coloring, a process for preparing PEIT by melt polymerization has already been described in patent application US 2006/0 173 154 A1. This process comprises a first step of esterification and a second step of polycondensation, in which a primary antioxidant is used during the esterification step and a secondary antioxidant is used during the polycondensation step. In the examples, a catalytic system comprising catalysts based on germanium and based on cobalt are used.

Patent applications WO 2013/183 873 and WO 2013/183 874 disclose processes for preparing polyesters, comprising a step of esterification of monomers comprising terephthalic acid, CHDM, isosorbide and an additional diol compound in the presence of an esterification catalyst which is a zinc-based compound. This catalyst makes it possible to improve the polymerization reaction kinetics and/or to increase the viscosity of the polymer obtained from this process. In the processes that are illustrated in these two applications, a germanium-based catalyst is introduced during the polycondensation step.

The Applicant has found, by performing studies on polymerization catalysts for the manufacture of polyesters containing 1,4:3,6-dianhydrohexitol units (see the examples below), that the polyesters obtained from these processes are not entirely satisfactory, especially in terms of coloring. This coloring may be very yellow, as is the case when a germanium-based polycondensation catalyst is used exclusively, or gray when a catalytic system comprising catalysts based on germanium and based on cobalt are used. There thus remains a need to find novel processes for manufacturing polyesters containing 1,4:3,6-dianhydrohexitol units, whose coloring is improved.

SUMMARY OF THE INVENTION

One subject of the invention is thus a process for manufacturing a polyester containing at least one 1,4:3,6-dianhydrohexitol unit, comprising at least:

a step of introducing into a reactor monomers comprising at least one monomer (A) which is a diacid or a diester and at least one monomer (B) which is a 1,4:3,6-dianhydrohexitol;

a step of introducing into the reactor a catalytic system comprising either a catalyst comprising the element germanium and a catalyst comprising the element aluminum, or a catalyst comprising the elements germanium and aluminum, or a mixture of these catalysts;

a step of polymerizing said monomers to form the polyester;

a step of recovering a polyester composition comprising the polyester and the catalytic system.

Catalytic systems combining a germanium-based catalyst with an aluminum-based catalyst have already been described for the manufacture of PET-type polyesters in patent application WO 2004/048 437. The colors of a polyester obtained from a germanium-based catalyst are compared in said application with those of a polyester obtained from a catalytic system comprising a germanium-based catalyst, an aluminum-based catalyst and a lithium-based catalyst. Whereas the polycondensation time is very substantially reduced, the coloring of the polyester is not improved. On the contrary, the polyester obtained is even more yellow or, in the case where a cobalt-based catalyst is added to the catalytic system, is darker.

Surprisingly, as demonstrated in the examples, the polyester recovered on conclusion of the process according to the invention has weaker coloring than that of a polyester obtained from a similar process which differs in the catalytic system used.

DETAILED DESCRIPTION OF THE INVENTION

The invention relates to a process for manufacturing a polyester containing at least one 1,4:3,6-dianhydrohexitol unit.

This process comprises a step of introducing monomers into a reactor. The monomers introduced into the reactor comprise at least one monomer (A) which is a diacid or a diester and at least one monomer (B) which is a 1,4:3,6-dianhydrohexitol.

According to the invention, the term "diacid or diester" means a dicarboxylic acid or a carboxylic acid diester.

According to a preferred embodiment, the monomer (A) is a diacid or a mixture of diacids. Certain diacids, such as phthalic acid or maleic acid, may also be in anhydride form.

The diacid may be an aromatic diacid, an aliphatic diacid or a mixture of these diacids.

Preferably, the diacid is aromatic. It may be chosen from terephthalic acid, isophthalic acid, phthalic acid, 2,6-naphthalenedicarboxylic acid, 1,4-naphthalenedicarboxylic acid, a furandicarboxylic acid, and a mixture of these diacids. Preferably, the aromatic acid is terephthalic acid. The monomer (A) may also be an aliphatic diacid or a mixture of these diacids. The aliphatic diacid may be a saturated or unsaturated aliphatic diacid.

The saturated aliphatic diacid may be linear, branched or cyclic. As regards the linear saturated aliphatic diacid, it may be chosen from succinic acid, glutaric acid, adipic acid, pimelic acid, suberic acid, azelaic acid and sebacic acid, and mixtures thereof. Preferably, the linear saturated aliphatic diacid is chosen from succinic acid, adipic acid and a mixture thereof, most preferentially succinic acid. As saturated cyclic aliphatic diacid, mention may be made of 1,4-cyclohexanedioic acid.

The monomer (A) may also be an unsaturated aliphatic diacid such as fumaric acid or maleic acid or itaconic acid or a mixture of these diacids.

As regards the case in which the monomer (A) is a diester (or a mixture of diesters), the diester is preferably a methyl and/or ethyl diester. The diester may be chosen from diesters of the diacids mentioned previously. Preferably, the diester is a diester of an aromatic diacid, preferably a diester of terephthalic acid, of isophthalic acid, of phthalic acid, of 2,6-naphthalenedicarboxylic acid, of 1,4-naphthalenedicarboxylic acid, of furandicarboxylic acid, or a mixture of these diesters, most preferentially a terephthalic acid diester.

According to the invention, a mixture of diacid(s) and of diester(s) may also be used as monomers (A).

The monomer (B) is a 1,4:3,6-dianhydrohexitol. As explained previously, 1,4:3,6-dianhydrohexitols have the drawback of causing coloring of the polyester when the monomers and the manufacturing processes conventionally used for their manufacture are used. The 1,4:3,6-dianhydrohexitol may be isosorbide, isomannide, isoidide, or a mixture thereof, and is preferably isosorbide. Isosorbide, isomannide and isoidide may be obtained, respectively, by dehydration of sorbitol, of mannitol and of iditol. As regards isosorbide, it is sold by the Applicant under the brand name Polysorb® P.

Preferably, the monomers introduced into the reactor also comprise a diol (C), other than the 1,4:3,6-dianhydrohexitols.

The diol (C) may be:
an aliphatic diol, especially a linear aliphatic diol (C1), a cycloaliphatic diol (C2), a branched aliphatic diol (C3) or;
an aromatic diol (C4);
or a mixture of these diols.

The diol (C1) is advantageously chosen from ethylene glycol, 1,3-propanediol, 1,4-butanediol, 1,5-pentanediol, 1,6-hexanediol, 1,8-octanediol, 1,10-decanediol, or a mixture of these diols, preferentially ethylene glycol, 1,4-butanediol and a mixture of these diols, very preferentially ethylene glycol.

The diol (C2) may be cyclobutanediol, for example tetramethylcyclobutanediol, bis-hydroxymethyl tricyclodecane or cyclohexanedimethanol, especially 1,4-cyclohexanedimethanol, 1,2-cyclohexanedimethanol or 1,3-cyclohexanedimethanol or a mixture of these diols or isomers of these diols. Specifically, these diols may be in cis or trans configuration. When various isomers exist for the same monomer, unless explicitly mentioned, when this monomer is referred to, it may be an isomer of this monomer or a mixture of isomers.

The diol (C3) made, for its part, be 2-methyl-1,3-propanediol, 2,2,4-trimethyl-1,3-pentanediol, 2-ethyl-2-butyl-1,3-propanediol, propylene glycol, neopentyl glycol or a mixture of these diols.

The diol (C) is advantageously chosen from aliphatic diols, preferentially chosen from ethylene glycol, 1,3-propanediol, 1,4-butanediol, 1,5-pentanediol, 1,6-hexanediol, 1,8-octanediol, 1,10-decanediol, 1,4-cyclohexanedimethanol, 1,2-cyclohexanedimethanol, 1,3-cyclohexanedimethanol and mixtures of these diols, very preferentially ethylene glycol, 1,4-butanediol, 1,4-cyclohexanedimethanol and mixtures of these diols, most preferably ethylene glycol, 1,4-cyclohexanedimethanol and the mixture of these diols.

According to a first advantageous variant in which the diol (C) is introduced into the reactor, the monomer (A) is terephthalic acid, the monomer (B) is isosorbide and the monomer (C) is ethylene glycol.

According to a second advantageous variant in which the diol (C) is introduced into the reactor, the monomer (A) is terephthalic acid, the monomer (B) is isosorbide and the diol (C) is a mixture of ethylene glycol and 1,4-cyclohexanedimethanol.

Advantageously, the molar percentage of monomers (A) relative to the total number of moles of monomers (A), (B) and, where appropriate, (C) ranges from 25% to 50%, preferably from 33% to 49% and most preferentially from 40% to 48%.

Preferably, when the monomers (C) are introduced into the reactor, the molar percentage of (B), relative to the total number of moles of monomers (B) and (C), ranges from 1% to 50%, preferably from 2% to 30% and most preferentially from 5% to 20%.

The monomers (B) and (C) may be introduced into the reactor in the form of an aqueous solution.

Monomers other than the monomers (A), (B) and, where appropriate, (C), known as "additional monomers", may also be added.

They may be hydroxy acid monomers bearing a hydroxide function and a carboxylic acid function. By way of example, the hydroxy acid may be glycolic acid, lactic acid, hydroxybutyric acid, hydroxycaproic acid, hydroxyvaleric acid, 7-hydroxyheptanoic acid, 8-hydroxyoctanoic acid, 9-hydroxynonanoic acid, hydroxymethylfurancarboxylic acid or hydroxybenzoic acid, or a mixture of these hydroxy acids. As additional monomer that may be used, mention may also be made of dilactones such as glycolide or lactide.

Preferably, the amount of hydroxy acid monomers is, relative to the total sum of the monomers, less than 10 mol %. The monomers introduced into the reactor may be free of hydroxy acid monomers.

The additional monomers may also comprise chain-extending monomers, which are themselves generally introduced into the reactor before or during the formation of the polyester manufactured during the polymerization step, or alternatively before a second step known as the "post-polymerization step" consisting in reacting the polyester formed during the polymerization step with the chain-extending monomer. This post-polymerization step may especially be a step of reactive extrusion of the chain-extending monomer with the polyester recovered after the polymerization step.

The term "chain-extending monomer" means a monomer comprising two functions other than the hydroxyl, carboxylic acid and carboxylic acid ester functions, and that is capable of reacting with these same functions. The functions may be isocyanate, isocyanurate, lactam, lactone, carbonate, epoxy, oxazoline and imide functions, it being possible for said functions to be identical or different. As chain-extending monomers that may be used in the present invention, mention may be made of:

diisocyanates, preferably methylenediphenyl diisocyanate (MDI), isophorone diisocyanate (IKA), dicyclohexylmethane diisocyanate (H12MDI), toluene diisocyanate (TDI), naphthalene diisocyanate (NDI), hexamethylene diisocyanate (HMDI) or lysine diisocyanate (LDI), the aliphatic diisocyanate having a molar mass of 600 g/mol obtained from fatty diacid dimers (DDI®1410 Diisocyanate), diisocyanate dimers, trimers and tetramers, prepolymers termed "isocyanate-free" resulting from a reaction of a diol or of an amine with a diisocyanate under conditions such that the prepolymer contains an isocyanate function at each of its ends ($\alpha,\omega$-functional or telechelic polymer) without it being possible for free diisocyanate to be detected, dialkyl carbonates, in particular dianhydrohexitol dialkyl carbonates, and in particular isosorbide dialkyl carbonates, dicarbamoylcaprolactams, preferably 1,1'-carbonyl-bis-caprolactam, dicarbamoylcaprolactones, diepoxides, compounds comprising an epoxide function and a halide function, preferably epichlorohydrin, heterocyclic compounds, preferably bis-oxazolines, bis-oxazolin-5-ones and bis-azalactones, methylenic or ethylenic diester derivatives, preferably methyl or ethyl carbonate derivatives, any mixtures of at least any two of the abovementioned products.

Preferably, the amount of chain-extending monomers is, relative to the total sum of the monomers introduced, less than 10 mol %. The monomers introduced into the reactor may be free of chain-extending monomers.

The additional monomers may also be polyfunctional monomers. The term "polyfunctional monomer" means a monomer that is capable of reacting with hydroxide and/or carboxylic acid and/or carboxylic acid ester functions and whose functionality is greater than 2. The polyfunctional monomers may be introduced into the reactor before the polymerization or post-polymerization step as described previously (the polyfunctional monomer then replacing the chain-extending monomer), preferentially before the polymerization step. The reactive functions of these branching agents may be hydroxide, carboxylic acid, anhydride, isocyanate, isocyanurate, caprolactam, caprolactone, carbonate, epoxy, oxazoline and imide functions, it being possible for said functions to be identical or different, preferably carboxylic acid, hydroxide, epoxide or isocyanate functions, most preferentially carboxylic acid or hydroxide functions. The functionality of these branching agents may be from 3 to 6, preferably from 3 to 4. Among the branching agents conventionally used, mention may be made of: malic acid, citric acid or isocitric acid, tartaric acid, trimesic acid, tricarballylic acid, cyclopentanetetracarboxylic acid, trimellitic anhydride, pyromellitic monoanhydride or dianhydride, glycerol, pentaerythritol, dipentaerythritol, monoanhydrosorbitol, monoanhydromannitol, epoxidized oils, dihydroxystearic acid, trimethylolpropane, ethers of these polyols, for instance glyceryl propoxylate (sold under the name Voranol 450 by Dow Chemical), polymers bearing epoxide side functions, triisocyanates, tetraisocyanates and also the respective homopolymers of di-, tri- and tetraisocyanates that exist, polyanhydrides, and alkoxysilanes, preferably tetraethoxysilane.

Preferably, the amount of polyfunctional monomers is, relative to the total sum of the monomers, less than 10 mol %. The monomers introduced into the reactor may be free of polyfunctional monomers.

Advantageously, relative to the total amount of monomers introduced into the reactor, the molar amount of additional monomer is less than 20%, preferentially less than 10%, or even less than 5%. The monomers introduced into the reactor may be free of additional monomers.

The process according to the invention also comprises a step of introducing into the reactor a catalytic system comprising:

either a catalyst comprising the element germanium and a catalyst comprising the element aluminum;

or a catalyst comprising the elements germanium and aluminum;

or a mixture of these catalysts.

According to the first variant, as regards the catalyst comprising the element germanium, it may be chosen from the following compounds: aliphatic carboxylic acid salts such as formate, acetate, propionate, butyrate, oxalate, acrylate, methacrylate, aromatic carboxylic acid salts such as benzoate, halogenated carboxylic acid salts such as trichloroacetate, trifluoroacetate, hydroxycarbonate salts such as lactate, citrate, oxalate, mineral salts such as carbonate, sulfate, nitrate, phosphate, phosphonate, phosphinate, hydrogen sulfate, hydrogen carbonate, hydrogen phosphate, sulfite, thiosulfate, hydrochloride, hydrobromide, chloride, chlorate, bromide, bromate, organosulfonates such as 1-propanesulfonate, 1-pentanesulfonate, naphthalenesulfonate, organic sulfates such as lauryl sulfate, alkoxides such as methoxy, ethoxy, propoxy, isopropoxy, butoxy, acetylacetonates, oxides, mixed oxides comprising other metals or hydroxides, preferably germanium dioxide.

The catalyst comprising the element aluminum may be chosen from the following compounds: aliphatic carboxylic acid salts such as formate, acetate, propionate, butyrate, oxalate, acrylate, methacrylate, aromatic carboxylic acid salts such as benzoate, halogenated carboxylic acid salts such as trichloroacetate, trifluoroacetate, hydroxycarbonate salts such as lactate, citrate, oxalate, mineral salts such as carbonate, sulfate, nitrate, phosphate, phosphonate, phosphinate, hydrogen sulfate, hydrogen carbonate, hydrogen phosphate, sulfite, thiosulfate, hydrochloride, hydrobromide, chloride, chlorate, bromide, bromate, organosulfonates such as 1-propanesulfonate, 1-pentanesulfonate, naphthalenesulfonate, organic sulfates such as lauryl sulfate, alkoxides such as methoxy, ethoxy, propoxy, isopropoxy, butoxy, acetylacetonates, oxides, mixed oxides comprising other metals or hydroxides, preferably aluminum triethoxide.

According to the second variant, the catalytic system comprises a catalyst comprising the elements germanium and aluminum, for example comprises a mixed oxide of aluminum and of germanium.

According to a third variant, the catalytic system comprises a mixture of the catalysts described in the two preceding variants.

The catalytic system may be chosen so that the molar elemental ratio Ge:Al ranges from 0.05:1 to 500:1, advantageously from 0.2 to 300:1, preferably from 0.33:1 to 1.25:1. It is pointed out that this elemental ratio only takes into consideration the metals included in the catalytic system.

According to the first and third variants, the catalysts may be chosen and present in amounts such that the elemental mole ratio Ge:Al is as described previously.

According to the second variant, the catalyst comprising the elements germanium and aluminum is chosen such that the elemental mole ratio Ge:Al is as described previously.

The catalytic system may also comprise additional metals.

According to an advantageous embodiment of the invention, the catalytic system comprises the element cobalt, i.e.:
the catalytic system also comprises an additional catalyst comprising the element cobalt;
or at least one of the catalysts comprising the element germanium and/or the element aluminum also comprises the element cobalt.

The use of a catalytic system comprising the element cobalt makes it possible especially to obtain polyester compositions with improved coloring b*.

As examples of additional catalysts comprising the element cobalt, mention may be made of the following compounds: aliphatic carboxylic acid salts such as formate, acetate, propionate, butyrate, oxalate, acrylate, methacrylate, aromatic carboxylic acid salts such as benzoate, halogenated carboxylic acid salts such as trichloroacetate, trifluoroacetate, hydroxycarbonate salts such as lactate, citrate, oxalate, mineral salts such as carbonate, sulfate, nitrate, phosphate, phosphonate, phosphinate, hydrogen sulfate, hydrogen carbonate, hydrogen phosphate, sulfite, thiosulfate, hydrochloride, hydrobromide, chloride, chlorate, bromide, bromate, organosulfonates such as 1-propanesulfonate, 1-pentanesulfonate, naphthalenesulfonate, organic sulfates such as lauryl sulfate, alkoxides such as methoxy, ethoxy, propoxy, isopropoxy, butoxy, acetylacetonates, oxides, mixed oxides comprising other metals or hydroxides, preferably cobalt acetate.

When at least one of the catalysts comprising the element germanium and/or the element aluminum also comprises the element cobalt, this catalyst may be a mixed oxide of aluminum, germanium and cobalt; a mixed oxide of aluminum and cobalt; or a mixed oxide of germanium and cobalt.

For reasons of simplicity and availability of catalysts, it is preferred to use a catalytic system of a catalytic system comprising a catalyst comprising the element germanium and a catalyst comprising the element aluminum. Advantageously, the total mass amount of metal included in the catalytic system introduced into the reactor, relative to the total mass amount of polymer obtained, ranges from 50 to 500 ppm.

The catalytic system may be introduced into the reactor before or during the polymerization step, preferentially before the polymerization step. It may be introduced via different stages of introduction, for example by introducing different catalysts at different times. Preferably, when the catalytic system comprises different catalysts, they are introduced simultaneously into the reactor, most preferentially simultaneously and before the polymerization step. The catalyst(s) may be used in unmodified form or in the form of solution(s), especially aqueous or alcoholic solution(s), preferably in the form of a solution in a monomer such as ethylene glycol, in which the catalyst(s) are diluted or dispersed.

The process according to the invention also comprises a step of polymerization of the monomers to form the polyester. Advantageously, this polymerization step takes place via the melt route, i.e. by keeping the reaction medium in the molten state in the reactor, in the absence of solvent. This polymerization step may take place by supplying heat heat. This polymerization step may also take place under vacuum.

Preferably, the monomer polymerization step comprises:
a first stage during which the reaction medium is stirred at a temperature ranging from 220 to 310° C. so as to form oligomers, advantageously from 245 to 275° C.;
a second stage during which the oligomers formed are stirred under vacuum, at a temperature ranging from 240 to 330° C. so as to form the polyester, advantageously from 255 to 275° C.

The reaction medium may be stirred by any type of stirrer conventionally used for polyester synthesis. The stirring speed may be kept constant during the polymerization step or the stirring speed may be reduced during the reaction, gradually as the viscosity of the polyester increases.

The first stage may take place at atmospheric pressure or under pressure, generally at a pressure ranging from 1.1 to 10 bar.

The oligomers formed during the first stage generally have a number-average molar mass of less than 5000 g/mol, usually less than 4000 g/mol. They generally have a viscosity index of less than 20 mL/g.

The monitoring of this first stage may take place by monitoring the change in the amount of distillates extracted from the reactor.

As regards the second stage of the polymerization step, it takes place under vacuum, preferably at a pressure below 10 mbar, most preferentially below 1 mbar.

The monitoring of the polymerization reaction may take place by monitoring the change in the amount of torque measured on the stirrer or via any other system for evaluating the viscosity of the molten reaction medium.

Advantageously, the catalytic system, comprising the catalyst(s) described previously, is introduced into the reactor before the first stage of the polymerization step.

Preferably, the process comprises a step of deoxygenation of the reactor performed before the monomer polymerization step, and especially before the first stage of formation of the oligomers, advantageously by placing the reactor under an atmosphere of an inert gas such as nitrogen. This deoxygenation step is generally performed at low temperature, i.e. usually at a temperature below 100° C. This may take place by performing, at least once, a sequence of a vacuum stage, for example between 100 and 700 mbar in the reactor, followed by a stage of introducing an inert gas into the reactor, for example between 1.2 and 2 bar. This vacuum-inert gas introduction cycle may take place, for example, from 3 to 5 times. Preferably, this vacuum-nitrogen cycle is performed at a temperature between 60 and 80° C. so that the reagents, and especially the monomers (B), are totally molten. This deoxygenation step has the advantage of further improving the coloring properties of the polyester obtained at the end of the process.

When the reactor is placed under vacuum, especially during the second stage of polymerization of the oligomers, it should be noted that a small portion of the monomers may be extracted from the reactor and may thus be lost. This is in particular a small portion of the monomers that are the most volatile and in excess. This loss of monomers may also lead to the entrainment of a small loss of catalyst.

In addition, "polymerization additives" may also be introduced into the reactor before the polymerization step.

Among the polymerization additives, mention may be made of antioxidants that make it possible to further reduce the coloring of the polyester obtained. The antioxidants may be primary and/or secondary antioxidants. The primary antioxidant may be a sterically hindered phenol, such as the compounds Hostanox® 0 3, Hostanox® 0 10, Hostanox® 0 16, Ultranox® 210, Ultranox®276, Dovernox® 10, Dovernox® 76, Dovernox® 3114, Irganox®1010 or Irganox®1076 or a phosphonate such as Irgamod®195. The secondary antioxidant may be trivalent phosphorus compounds such as Ultranox® 626, Doverphos® S-9228, Hostanox® P-EPQ or lrgafos 168.

It is also possible to introduce as polymerization additive into the reactor at least one compound that is capable of limiting spurious etherification reactions, such as sodium acetate, tetramethylammonium hydroxide or tetraethylammonium hydroxide.

The process according to the invention also comprises a step of recovering a polyester composition comprising the polyester and the catalytic system. This composition may be recovered by extracting it from the reactor in the form of a molten polymer rod. After cooling, this rod can be converted into granules using conventional granulation techniques.

The polyester obtained on conclusion of the polycondensation step may, after cooling, be semicrystalline or amorphous.

The process according to the invention may also comprise, after the step of recovering the polyester composition, a step of solid-state polycondensation (SSP). A person skilled in the art can readily perform this SSP step starting with semicrystalline polyesters.

A subject of the invention is also the polyester composition that may be obtained according to the process of the invention, in which the polyester contains at least one 1,4:3,6-dianhydrohexitol unit, the composition also comprising a catalytic system comprising either a catalyst comprising the element germanium and a catalyst comprising the element aluminum, or a catalyst comprising the elements germanium and aluminum, or a mixture of these catalysts.

The catalytic system included in the polyester composition is identical to that described previously for the process according to the invention. Thus, in the polyester composition according to the invention, the metals included in the catalytic system may have an elemental mole ratio Ge:Al which ranges from 0.05:1 to 500:1, advantageously from 0.2 to 300:1, preferably from 0.33:1 to 1.25:1.

The amounts of catalyst in the polyester composition are also similar, but may be slightly lower than those introduced into the reactor, due to the possible loss by entrainment of catalyst described previously. However, it may be considered that these losses are relatively low. The total mass amount of metal included in the catalytic system of the polyester composition, relative to the total mass amount of polyester, generally ranges from 30 to 500 ppm.

The amounts of metal in the catalysts included in the polyester may be determined by elemental analysis.

According to the invention, the term "monomer units" means units, included in the polyester, which may be obtained after polymerization of a monomer. By way of example, as regards the ethylene glycol and terephthalic acid units included in a PET, they may be obtained either by esterification reaction of ethylene glycol and terephthalic acid, or by transesterification reaction of ethylene glycol and terephthalic acid ester.

The polyester included in the composition according to the invention may comprise, relative to the total amount of diol units (B) and, where appropriate, (C) of the polyester, from 0.1% to 100% of 1,4:3,6-dianhydrohexitol units (100% is the case in which no monomer (C) is employed during the process), advantageously from 1% to 50%, preferably from 2% to 30%, most preferentially from 5% to 20%.

According to a first most preferred variant, the polyester included in the composition comprises, relative to the sum of the monomer units:
from 45% to 55% of terephthalic acid units;
from 1% to 25% of isosorbide;
from 20% to 54% of ethylene glycol.

According to a second most preferred variant, the polyester included in the composition comprises, relative to the sum of the monomer units:
from 45% to 55% of terephthalic acid units;
from 1% to 25% of isosorbide units;
from 1% to 53% of ethylene glycol units;
from 1% to 53% of 1,4-cyclohexanedimethanol units.

The number of diacid units and the number of diol units are generally substantially identical. The ratio of diol units/diacid units included in the polyester may range from 1.15/1 to 0.85/1, usually from 1.08/1 to 0.92/1.

The amounts of various units in the polyester can be determined by $^1$H NMR.

A person skilled in the art can readily find the analysis conditions for determining the amounts of each of the units of the polyester. For example, from an NMR spectrum of a poly(ethylene-co-isosorbide terephthalate), the chemical shifts relating to the ethylene glycol are between 4.4 and 5.0 ppm, the chemical shifts relating to the terephthalate ring are between 7.8 and 8.4 ppm and the chemical shifts relating to the isosorbide are between 4.1 ppm and 5.8 ppm. The integration of each signal makes it possible to determine the amount of each unit of the polyester.

Preferably, the polyester composition has a lightness $L^*$ of greater than 45, preferably greater than 55.

In the case where a solid-state polycondensation step is performed, the lightness $L^*$ may reach or even exceed 65.

Preferably, the polyester composition has a coloring $b^*$ of between −10 and 10, preferably between −6 and 6. This parameter makes it possible to quantify coloring ranging from blue (if $b^*$ is negative) to yellow (if $b^*$ is positive).

The parameters $L^*$ and $b^*$ may be determined using a spectrophotometer, via the CIE Lab model.

The polyester composition may have a relative viscosity of greater than 35 mL/g, preferably greater than 50 mL/g. The viscosity index may be determined according to the method described in the example section.

The number-average molar mass of the polyester included in the polyester composition according to the invention may range from 5000 to 50 000 g/mol.

The molar mass of the polyester may be determined by conventional methods, for instance by size exclusion chromatography (SEC) in a mixture of chloroform and 1,1,1,3,3,3-hexafluoro-2-propanol in a 98/2 volume ratio. The signal may then be detected by a differential refractometer calibrated with poly(methyl methacrylate) standards.

Preferably, the glass transition temperature of the polyester is greater than or equal to 80° C. The glass transition temperature of the polyester may be measured by conventional methods, especially using differential scanning calorimetry (DSC) using a heating rate of 10 K/min. The experimental protocol is described in detail in the example section below. Advantageously, the polyester has a glass transition temperature ranging from 80 to 190° C.

The invention also relates to a composition comprising the polyester according to the invention and at least one additive or at least one additional polymer or at least a mixture thereof.

The polyester composition according to the invention may comprise the polymerization additives optionally used during the process. It may also comprise other additives and/or additional polymers that are generally added during a subsequent thermomechanical mixing step.

Examples of additives that may be mentioned include fillers or fibers of organic or mineral, nanometric or non-nanometric, functionalized or non-functionalized nature. They may be silicas, zeolites, glass fibers or beads, clays, mica, titanates, silicates, graphite, calcium carbonate, carbon nanotubes, wood fibers, carbon fibers, polymer fibers, proteins, cellulose-based fibers, lignocellulosic fibers and non-destructured granular starch. These fillers or fibers can make it possible to improve the hardness, the rigidity or the water- or gas-permeability. The composition may comprise from 0.1% to 75% by weight of fillers and/or fibers relative to the total weight of the composition, for example from 0.5% to 50%. The additive that is of use in the composition according to the invention may also comprise opacifiers, dyes and pigments. They may be chosen from cobalt acetate and the following compounds: HS-325 Sandoplast® Red BB (which is a compound bearing an azo function, also known under the name Solvent Red 195), HS-510 Sandoplast® Blue 2B which is an anthraquinone, Polysynthren® Blue R, and Clariant® RSB Violet.

The composition may also comprise, as additive, a processing aid, for reducing the pressure in the processing tool. A demolding agent for reducing the adhesion to the materials for forming the polyester, such as the molds or the calendering rollers, may also be used. These agents may be selected from fatty acid esters and fatty acid amides, metal salts, soaps, paraffins and hydrocarbon-based waxes. Particular examples of these agents are zinc stearate, calcium stearate, aluminum stearate, stearamide, erucamide, behenamide, beeswaxes or candelilla wax.

The composition according to the invention may also comprise other additives, such as stabilizers, for example light stabilizers, UV stabilizers and heat stabilizers, fluidizers, flame retardants and antistatic agents.

The composition may also comprise an additional polymer, other than the polyester according to the invention. This polymer may be chosen from polyamides, polyesters other than the polyester according to the invention, polystyrene, styrene copolymers, styrene-acrylonitrile copolymers, styrene-acrylonitrile-butadiene copolymers, poly(methyl methacrylate)s, acrylic copolymers, poly(ether-imide)s, poly(phenylene oxide)s, such as poly(2,6-dimethylphenylene oxide), poly(phenylene sulfate)s, poly(ester-carbonate)s, polycarbonates, polysulfones, polysulfone ethers, polyether ketones, and mixtures of these polymers.

The composition may also comprise, as additional polymer, a polymer for improving the impact properties of the polymer, especially functional polyolefins such as functionalized ethylene or propylene polymers and copolymers, core-shell copolymers or block copolymers.

The composition according to the invention may also comprise polymers of natural origin, such as starch, cellulose, chitosans, alginates, proteins such as gluten, pea proteins, casein, collagen, gelatin or lignin, these polymers of natural origin possibly being physically or chemically modified. The starch may be used in destructured or plasticized form. In the latter case, the plasticizer may be water or a polyol, especially glycerol, polyglycerol, isosorbide, sorbitans, sorbitol, mannitol or urea. The process described in WO 2010/010 282 A1 may especially be used to prepare the composition.

The composition according to the invention may be produced by conventional thermoplastic transformation methods. These conventional methods comprise at least one step of mixing the polymers in the molten or softened state and a step of recovering the composition. This process may be performed in paddle or rotor internal mixers, external mixers, or single-screw or twin-screw corotating or counter-rotating extruders. However, it is preferred to prepare this mixture by extrusion, in particular using a corotating extruder.

The mixing of the constituents of the composition may take place under an inert atmosphere.

In the case of an extruder, the various constituents of the composition may be introduced by means of feed hoppers located along the extruder.

The invention also relates to an article comprising the polyester or the composition according to the invention.

This article may be of any type and may be obtained using conventional transformation techniques.

It may be, for example, fibers or threads that are of use in the textile industry or other industries. These fibers or threads may be woven so as to form fabrics, or else nonwovens.

The article according to the invention may also be a film or a sheet. These films or sheets may be produced by calendering, film cast extrusion or blown film extrusion techniques.

The article according to the invention may also be a container for transporting gases, liquids and/or solids. The containers concerned may be baby's bottles, flasks, bottles, for example sparkling or still water bottles, juice bottles, soda bottles, carboys, alcoholic drink bottles, small bottles, for example small medicine bottles, small bottles for cosmetic products, dishes, for example for ready meals, microwave dishes, or lids. These containers may be of any size. They may be produced by extrusion-blow molding, thermoforming or injection-blow molding.

These articles may also be optical articles, i.e. articles requiring good optical properties, such as lenses, disks, transparent or translucent panels, optical fibers, films for LCD screens or window panes. These optical articles have the advantage of being able to be placed close to light sources and therefore to heat sources, while retaining excellent dimensional stability and good resistance to light.

The articles may also be multilayer articles, at least one layer of which comprises the polymer or the composition according to the invention. These articles may be produced via a process comprising a coextrusion step in the case where the materials of the various layers are placed in contact in the molten state. By way of example, mention may be made of the techniques of tube coextrusion, profile coextrusion, coextrusion blow-molding of a bottle, a small bottle or a tank, generally collated under the term "coextrusion blow-molding of hollow bodies", coextrusion blow-molding also known as film blowing, and cast coextrusion.

They may also be produced according to a process comprising a step of applying a layer of molten polyester onto a layer based on organic polymer, metal or adhesive composition in the solid state. This step may be performed by pressing, by overmolding, stratification or lamination, extrusion-lamination, coating, extrusion-coating or spreading.

The invention also relates to the use of the catalytic system described previously in a polymerization process for reducing the coloring of a polyester containing at least one 1,4:3,6-dianhydrohexitol unit.

It is pointed out that all the embodiments described previously, which concern the process and the polyester composition according to the invention, are applicable to the use according to the invention.

The invention will now be illustrated in the examples below. It is pointed out that these examples do not in any way limit the present invention.

EXAMPLES

The properties of the polymers were studied via the following techniques:

The reduced solution viscosity is evaluated using an Ubbelohde capillary viscometer at 25° C. in an equi-mass mixture of phenol and ortho-dichlorobenzene after dissolving the polymer at 130° C. with stirring. For these measurements, the polymer concentration introduced is 5 g/L.

The color of the polymer was measured on the granules using a Konica Minolta CM-2300d spectrophotometer.

For the illustrative examples presented below, the following reagents were used:

Monomers

Monomer (A): Terephthalic acid (99+% purity) from Acros

Monomer (B): Isosorbide (purity >99.5%) Polysorb® P from Roquette Freres

Monomer (C): Ethylene glycol (purity >99.8%) from Sigma-Aldrich

Catalysts

Titanium butoxide (>97%) from Sigma-Aldrich

Germanium dioxide (>99.99%) from Sigma-Aldrich

Aluminum triethioxide (>97%) from Sigma-Aldrich n-Butyltin hydroxide oxide (95%) from ABCR GmbH Molybdenum trioxide (>99.5%) from Sigma-Aldrich Cobalt acetate tetrahydrate (99.999%) from Sigma-Aldrich Polymerization Additives Irgamod® 195 from BASF SE: Antioxidant Irgamod 1010 from BASF SE: Antioxidant Hostanox PEPQ from Clariant: Antioxidant Phosphoric acid (99.999+%) from Sigma-Aldrich: Antioxidant Sodium acetate trihydrate (purity >99.0%): polymerization additive for limiting etherification reactions Tetraethylammonium hydroxide as a 40% solution in water, from Sigma-Aldrich: polymerization additive for limiting etherification reactions Preparation of the Polyesters:

Example 1

893.8 g (14.4 mol) of ethylene glycol, 701.1 g (4.8 mol) of isosorbide, 2656.1 g (16.0 mol) of terephthalic acid, 0.181 g of sodium acetate and 0.707 g of Irgamod 195 are placed in a 7.5 L reactor. 0.394 g of germanium dioxide (i.e. Ge=80 ppm) and 1.216 g of aluminum triethoxide (i.e. Al=60 ppm) are also introduced as catalysts.

To extract the residual oxygen from the isosorbide crystals, four vacuum-nitrogen cycles are performed between 60 and 80° C. The reaction mixture is then heated to 260° C. (4° C./min) under 5.7 bar of pressure and with constant stirring (150 rpm). The degree of esterification is estimated from the amount of distillate collected. The pressure is then reduced to 0.7 mbar over 90 minutes and the temperature is raised to 270° C. These vacuum and temperature conditions were maintained until an increase in torque of 15 Nm relative to the initial torque is obtained. The polycondensation time required is reported in the table below. Finally, a polymer rod is cast via the bottom valve of the reactor, cooled in a heat-regulated water bath and chopped in the form of granules of about 15 mg. The poly(ethylene-co-isosorbide) terephthalate resin thus obtained has a reduced solution viscosity of 55.8 mL/g and a number-average molar mass of 10 300 g·mol$^{-1}$. The polymer granules obtained are pale yellow and have the following coloring characteristics: L*=56.7, a*=0.0 and b*=9.4.

Examples 2-6 and Counter-Examples 1-7

For the series of examples from 2 to 13, identical synthetic conditions were used, except for the nature and proportions of catalysts. These conditions are given in Table 1.

TABLE 1

Summary of the poly(ethylene-co-isosorbide) terephthalate manufacturing tests

| | Catalytic system | | | | | $t_{poly.}$ | $\eta_{red}$ | Color | | | |
|---|---|---|---|---|---|---|---|---|---|---|---|
| | M1 | (ppm) | M2 | (ppm) | M3 | (ppm) | (min) | (mL/g) | | L* | a* | b* |
| CEx1 | Ge | 80  | —  | —   | — | —  | 288 | 56.2 | Yellow      | 52.3 | 0.7 | 12.6 |
| Ex1  | Ge | 80  | Al | 60  | — | —  | 260 | 55.8 | Pale yellow | 56.7 | 0.0 | 9.4  |
| Ex2  | Ge | 120 | Al | 45  | — | —  | 240 | 54.9 | Pale yellow | 60.9 | 0.2 | 9.8  |
| CEx2 | Ge | 200 | —  | —   | — | —  | 223 | 54.6 | Yellow      | 59.0 | 0.4 | 11.2 |
| Ex3  | Ge | 200 | Al | 60  | — | —  | 207 | 54.8 | Pale yellow | 61.0 | 0.0 | 9.4  |
| Ex4  | Ge | 200 | Al | 150 | — | —  | 213 | 53.4 | Pale yellow | 60.8 | 0.1 | 7.4  |
| CEx3 | Ge | 80  | Co | 30  | — | —  | 287 | 56.2 | Gray        | 45.2 | 0.3 | 3.9  |
| CEx4 | Ge | 200 | Co | 30  | — | —  | 222 | 54.1 | Gray        | 44.9 | 0.3 | 3.8  |
| CEx5 | Ge | 80  | Mo | 106 | — | —  | 200 | 52.2 | Black       | 37.5 | 0.2 | −0.5 |
| CEx6 | Ti | 8   | Al | 60  | — | —  | 310 | 53.8 | Orange      | 54.3 | 1.8 | 13.6 |
| CEx7 | Sn | 120 | Al | 60  | — | —  | 173 | 55.9 | Dark orange | 49.1 | 2.9 | 11.2 |
| Ex5  | Ge | 80  | Al | 60  | Co | 15 | 256 | 55.5 | Gray        | 45.9 | 0.5 | 5.7  |
| Ex6  | Ge | 80  | Al | 60  | Co | 30 | 254 | 51.8 | Gray        | 46.8 | 0.5 | 2.0  |

Example 7

422.1 g (6.8 mol) of ethylene glycol, 418.2 g (2.9 mol) of isosorbide, 1143.6 g (7.9 mol) of 1,4-cyclohexanedimethanol, 2656.0 g (16.0 mol) of terephthalic acid, 0.60 g of tetraethylammonium hydroxide and 1.94 g of Irganox 1010 are placed in a 7.5 L reactor. 0.703 g of germanium dioxide (i.e. Ge=126 ppm) and 0.538 g of cobalt acetate tetrahydrate (33 ppm) are also introduced as catalysts.

To extract the residual oxygen from the isosorbide crystals, four vacuum-nitrogen cycles are performed between 60 and 80° C. The reaction mixture is then heated to 250° C. (4° C./min) under 2.5 bar of pressure and with constant stirring (150 rpm). The degree of esterification is estimated from the amount of distillate collected. The pressure is then reduced to atmospheric pressure over 30 minutes. At atmospheric pressure, 0.71 g of aluminum triethoxide (i.e. Al=30 ppm), 0.42 g of phosphoric acid and 1.95 g of Hostanox PEPQ are added to the reactor. The pressure is then reduced to 0.7 mbar over 30 minutes and the temperature is raised to 265° C. These vacuum and temperature conditions were maintained for 220 minutes until an increase in torque of 12 Nm relative to the initial torque is obtained. Finally, a polymer rod is cast via the bottom valve of the reactor, cooled in a heat-regulated water bath and chopped in the form of granules of about 15 mg.

The resin thus obtained has a reduced solution viscosity of 61.5 mL/g. The polymer granules obtained are gray and have the following coloring characteristics: L*=48.8, a*=−0.4 and b*=0.3.

The examples show that the use of aluminum in addition to germanium makes it possible to substantially reduce the coloring of the final polymer (to constant $\eta_{red}$). This is noteworthy by comparing tests CEx1 with Ex1 for which an increase in the parameter L* and a decrease in the parameters a* and b* are observed. The same observations made with higher contents of catalysts 200 ppm of Ge (Cex2, Ex3, Ex4) or with Co in addition to Ge and Al (Ex6 and CEx3) lead to similar observations in terms of coloring.

Tests CEx 5, Cex6 and Cex7 show the advantage of the Ge/Al mixture relative to other mixtures of metals:
  The mixture Ge/Mo (CEx. 5), which is another catalytic system used in WO 2004/048 437, leads to a black polymer.
  In example CEx6, the addition of aluminum to the titanium does not afford catalytic synergy comparable to the Ge/Al couple, the polymerization is much longer and the final polymer is highly colored. It is pointed out that 8 ppm of Ti is a usual amount used for the synthesis of PET.
  Finally, test CEx7 shows that the use of tin in combination with aluminum does not, in this case either, afford a polymer with low coloring.

Example 7 shows another way of performing the invention, this time using a mixture of diols comprising ethylene glycol, isosorbide and cyclohexanedimethanol.

The invention claimed is:

1. A process for manufacturing a polyester containing at least one 1,4:3,6-dianhydrohexitol unit, comprising the successive steps in order:
   introducing into a reactor monomers comprising at least one monomer (A) which is a diacid or a diester and at least one monomer (B) which is a 1,4:3,6-dianhydrohexitol;
   introducing into the reactor a catalytic system comprising (1) a catalyst comprising the element germanium and a catalyst comprising the element aluminum, or (2) a catalyst comprising the elements germanium and aluminum, or (3) a mixture thereof;
   polymerizing said monomers to form the polyester; and
   recovering a polyester composition comprising the polyester and the catalytic system.

2. The manufacturing process as claimed in claim 1, wherein the monomer (A) is an aromatic monomer selected from the group consisting of terephthalic acid, isophthalic acid, phthalic acid, 2,6-naphthalenedicarboxylic acid, 1,4-naphthalenedicarboxylic acid, a furandicarboxylic acid, a mixture of these diacids, a diester of these diacids and a mixture of these diesters.

3. The manufacturing process as claimed in claim 2, wherein the monomer (A) is terephthalic acid or a terephthalic acid diester.

4. The manufacturing process as claimed claim 1, wherein the monomers also comprise at least one diol (C), other than 1,4:3,6-dianhydrohexitol, selected from the group consisting of aliphatic diols.

5. The manufacturing process as claimed in claim 1, wherein the step of polymerization of said monomers comprises:
   a first stage during which the reaction medium is stirred at a temperature ranging from 220 to 310° C. so as to form oligomers; and a second stage during which the oligomers formed are stirred under vacuum, at a temperature ranging from 240 to 330° C. so as to form the polyester.

6. The process as claimed in claim 1, wherein the catalytic system is introduced into the reactor before the polymerization step.

7. The manufacturing process as claimed in claim 1, wherein the catalytic system is chosen so that the elemental mole ratio Ge:Al ranges from 0.05:1 to 500:1.

8. The manufacturing process as claimed in claim 1, wherein the catalytic system also comprises an additional catalyst comprising the element cobalt, or at least one of the catalysts comprising the element germanium and/or the element aluminum also comprises the element cobalt.

9. The manufacturing process as claimed in claim 1, wherein a total mass amount of metal included in the catalytic system, relative to a total mass amount of polymer obtained, ranges from 50 to 500 ppm.

10. The process as claimed in claim 1, wherein the step of deoxygenation of the reactor is performed prior to the monomer polymerization step by placing the reactor under an atmosphere of an inert gas, by performing at least once a sequence of a stage of vacuum in the reactor followed by a stage of introducing an inert gas into the reactor.

11. The process as claimed in claim 1, wherein a molar percentage of monomer (A) relative to a total number of moles of monomers (A) and (B) ranges from 25% to 50%.

12. The process as claimed in claim 1, wherein the 1,4:3,6-dianhydrohexitol is isosorbide.

13. A polyester composition comprising
a polyester containing at least one 1,4:3,6-dianhydrohexitol unit and
a catalytic system comprising (1) a catalyst comprising the element germanium and a catalyst comprising the element aluminum, or (2) a catalyst comprising the elements germanium and aluminum, or (3) a mixture of these catalysts.

14. The polyester composition as claimed in claim 13, wherein the polyester composition has a lightness L* of greater than 45, as determined using a spectrophotometer, via the CIE Lab model.

15. The polyester composition as claimed in claim 13, comprising a coloring b* of between −10 and 10, as determined using a spectrophotometer, via the CIE Lab model.

16. The polyester composition as claimed in claim 13, having a reduced viscosity of greater than 35 mL/g, as determined using an Ubbelohde capillary viscometer at 25° C. in an equi-mass mixture of phenol and ortho-dichlorobenzene after dissolving the polymer at 130° C. with stirring, the polymer concentration introduced being 5 g/L.

17. An article comprising the polyester composition as claimed in claim 13.

18. The manufacturing process as claimed claim 1, wherein the monomers also comprise at least one diol (C), other than 1,4:3,6-dianhydrohexitol, selected from the group consisting of ethylene glycol, 1,3-propanediol, 1,4-butanediol, 1,5-pentanediol, 1,6-hexanediol, 1,8-octanediol, 1,10-decanediol, 1,4-cyclohexanedimethanol, 1,2-cyclohexanedimethanol, 1,3-cyclohexanedimethanol, and a mixture of these diols.

19. The manufacturing process as claimed in claim 1, wherein the monomers also comprise at least one diol (C), other than 1,4:3,6-dianhydrohexitol, selected from the group consisting of ethylene glycol, 1,4-butanediol, 1,4-cyclohexanedimethanol, and a mixture of these diols.

20. The manufacturing process as claimed claim 1, wherein the monomers also comprise at least one diol (C), other than 1,4:3,6-dianhydrohexitol, selected from the group consisting of ethylene glycol, 1,4-cyclohexanedimethanol, and a mixture of these diols.

* * * * *